(12) United States Patent
Wang et al.

(10) Patent No.: US 10,586,379 B2
(45) Date of Patent: Mar. 10, 2020

(54) INTEGRATION OF 3D MODELS

(71) Applicant: eBay Inc., San Jose, CA (US)

(72) Inventors: Qiaosong Wang, San Francisco, CA (US); James Thomas Dowdell, Oakland, CA (US); Jinrong Xie, San Jose, CA (US); Robinson Piramuthu, Oakland, CA (US)

(73) Assignee: eBay Inc., San Jose, CA (US)

( * ) Notice: Subject to any disclaimer, the term of this patent is extended or adjusted under 35 U.S.C. 154(b) by 77 days.

(21) Appl. No.: 15/709,997

(22) Filed: Sep. 20, 2017

(65) Prior Publication Data

US 2018/0261001 A1 Sep. 13, 2018

Related U.S. Application Data

(60) Provisional application No. 62/468,748, filed on Mar. 8, 2017.

(51) Int. Cl.
*G06K 9/00* (2006.01)
*G06T 15/20* (2011.01)
(Continued)

(52) U.S. Cl.
CPC .............. *G06T 15/205* (2013.01); *G06T 7/90* (2017.01); *G06T 17/20* (2013.01); *G06T 2200/08* (2013.01); *G06T 2207/10028* (2013.01)

(58) Field of Classification Search
CPC ......... G06T 15/205; G06T 7/90; G06T 17/20; G06T 2207/10028; G06T 2200/08
See application file for complete search history.

(56) References Cited

U.S. PATENT DOCUMENTS

| | | | | | |
|---|---|---|---|---|---|
| 5,526,478 | A | * | 6/1996 | Russell, Jr. | G06F 3/04812 715/202 |
| 6,144,388 | A | * | 11/2000 | Bornstein | G06T 11/00 345/629 |

(Continued)

FOREIGN PATENT DOCUMENTS

| | | |
|---|---|---|
| WO | 2015/173173 A1 | 11/2015 |
| WO | 2018/164949 A1 | 9/2018 |

OTHER PUBLICATIONS

International Written Opinion received for PCT Patent Application No. PCT/US2018/020629, dated May 15, 2018, 4 pages.

(Continued)

*Primary Examiner* — Aaron W Carter
(74) *Attorney, Agent, or Firm* — Schwegman Lundberg & Woessner, P.A.

(57) ABSTRACT

In various example embodiments, a system and method for integration of a three-dimensional model is disclosed. In one example embodiment, a method includes receiving a plurality of images, selecting points on the images and triangulating the points to generate a plurality of depth maps, generate a three-dimensional mesh by combining the plurality of depth maps, generating a three-dimensional model of the item by projecting the plurality of images onto the mesh using the points, calibrating colors used in the model using colors diffuse properties of the colors in the images, and providing a user interface allowing a user to select one or more user points on the three-dimensional model and provide additional information associated with the selected user points.

20 Claims, 10 Drawing Sheets

(51) Int. Cl.
*G06T 7/90* (2017.01)
*G06T 17/20* (2006.01)

(56) References Cited

U.S. PATENT DOCUMENTS

| | | | |
|---|---|---|---|
| 6,337,925 B1* | 1/2002 | Cohen | G06T 7/12 |
| | | | 382/164 |
| 6,434,278 B1 | 8/2002 | Hashimoto | |
| 7,689,035 B2* | 3/2010 | Mallick | G06T 5/30 |
| | | | 382/163 |
| 8,289,318 B1 | 10/2012 | Hadap et al. | |
| 8,525,828 B1* | 9/2013 | Bates | G06T 17/00 |
| | | | 345/419 |
| 8,605,989 B2* | 12/2013 | Rudin | G06K 9/00214 |
| | | | 345/419 |
| 9,094,670 B1* | 7/2015 | Furio | H04N 13/0221 |
| 9,962,921 B1* | 5/2018 | Lyon | G06F 17/50 |
| 2001/0020946 A1* | 9/2001 | Kawakami | G06K 9/00208 |
| | | | 345/582 |
| 2001/0043236 A1* | 11/2001 | Yamamoto | G06T 19/20 |
| | | | 715/781 |
| 2002/0024517 A1* | 2/2002 | Yamaguchi | A63F 13/10 |
| | | | 345/424 |
| 2003/0050864 A1* | 3/2003 | Trajkovic | G06Q 30/02 |
| | | | 705/26.35 |
| 2003/0098868 A1* | 5/2003 | Fujiwara | G06T 15/04 |
| | | | 345/582 |
| 2003/0117411 A1* | 6/2003 | Fujiwara | G06T 15/04 |
| | | | 345/582 |
| 2004/0227752 A1* | 11/2004 | McCartha | A41H 3/007 |
| | | | 345/419 |
| 2005/0012757 A1 | 1/2005 | Park et al. | |
| 2005/0204306 A1* | 9/2005 | Kawahara | G06F 3/0481 |
| | | | 715/782 |
| 2006/0083440 A1* | 4/2006 | Chen | H04N 5/23238 |
| | | | 382/284 |
| 2006/0266135 A1* | 11/2006 | Nishikawa | H04N 13/0488 |
| | | | 73/866.3 |
| 2007/0003302 A1* | 1/2007 | Mizes | G03G 15/5041 |
| | | | 399/49 |
| 2007/0080967 A1* | 4/2007 | Miller | G06K 9/00208 |
| | | | 345/473 |
| 2008/0292360 A1* | 11/2008 | Hirai | G01J 1/04 |
| | | | 399/220 |
| 2008/0307327 A1* | 12/2008 | Newcomer | G06T 19/20 |
| | | | 715/757 |
| 2009/0284527 A1* | 11/2009 | Ofek | G06T 19/00 |
| | | | 345/420 |
| 2010/0086721 A1* | 4/2010 | Batchelder | B65D 81/113 |
| | | | 428/43 |
| 2010/0098316 A1* | 4/2010 | Papaioannou | A61B 6/04 |
| | | | 382/132 |
| 2010/0157021 A1* | 6/2010 | Abraham | G06Q 30/06 |
| | | | 348/47 |
| 2012/0054026 A1* | 3/2012 | Robinson | G06Q 30/02 |
| | | | 705/14.49 |
| 2012/0081357 A1 | 4/2012 | Habbecke et al. | |
| 2012/0265647 A1* | 10/2012 | Negrillo | G06Q 30/0641 |
| | | | 705/26.62 |
| 2013/0076619 A1* | 3/2013 | Carr | G09G 5/00 |
| | | | 345/156 |
| 2013/0241928 A1* | 9/2013 | Brown | G06T 19/006 |
| | | | 345/420 |
| 2013/0249906 A1* | 9/2013 | Gunderson | G06T 15/20 |
| | | | 345/420 |
| 2013/0286161 A1* | 10/2013 | Lv | G06K 9/00214 |
| | | | 348/46 |
| 2014/0056510 A1* | 2/2014 | Van Bree | G06K 9/00208 |
| | | | 382/154 |
| 2014/0100996 A1* | 4/2014 | Klein | G06Q 30/0643 |
| | | | 705/27.2 |
| 2014/0125654 A1* | 5/2014 | Oh | G06T 17/00 |
| | | | 345/419 |
| 2014/0253547 A1* | 9/2014 | Schmidt | G06T 15/04 |
| | | | 345/420 |
| 2014/0375633 A1* | 12/2014 | Dillard | G06T 15/04 |
| | | | 345/420 |
| 2015/0106241 A1* | 4/2015 | Lucido | G06Q 30/0643 |
| | | | 705/27.2 |
| 2015/0134496 A1* | 5/2015 | Grinblat | G06T 19/00 |
| | | | 705/27.2 |
| 2015/0145966 A1 | 5/2015 | Krieger et al. | |
| 2015/0178988 A1 | 6/2015 | Montserrat mora et al. | |
| 2015/0339853 A1 | 11/2015 | Wolper et al. | |
| 2015/0379045 A1* | 12/2015 | Zhang | G06F 16/5838 |
| | | | 705/26.61 |
| 2016/0005211 A1* | 1/2016 | Sarkis | G06T 19/00 |
| | | | 345/419 |
| 2016/0042556 A1* | 2/2016 | Imber | G06T 15/04 |
| | | | 345/426 |
| 2016/0070952 A1* | 3/2016 | Kim | G06K 9/00208 |
| | | | 382/118 |
| 2016/0078687 A1* | 3/2016 | Van Bree | A61M 16/06 |
| | | | 345/419 |
| 2016/0092645 A1* | 3/2016 | Vlutters | G06F 17/5009 |
| | | | 715/771 |
| 2016/0127682 A1* | 5/2016 | Turbell | H04N 7/141 |
| | | | 348/14.03 |
| 2016/0212370 A1* | 7/2016 | Lee | H04N 5/44591 |
| 2016/0232375 A1* | 8/2016 | Loeb | G06F 21/6245 |
| 2016/0253821 A1 | 9/2016 | Romano et al. | |
| 2016/0335712 A1* | 11/2016 | Tapley | G06Q 30/0643 |
| 2016/0350618 A1* | 12/2016 | Meekins | G06T 15/04 |
| 2017/0140574 A1* | 5/2017 | Sugita | G06T 19/00 |
| 2017/0154461 A1* | 6/2017 | Rhee | G06T 15/04 |
| 2017/0156430 A1* | 6/2017 | Karavaev | A41H 1/02 |
| 2017/0157856 A1* | 6/2017 | Pratt | B33Y 50/00 |
| 2017/0212661 A1* | 7/2017 | Ito | G06F 3/04815 |
| 2017/0372527 A1* | 12/2017 | Murali | G06F 3/048 |
| 2018/0075592 A1* | 3/2018 | White | G06T 7/80 |
| 2018/0124378 A1* | 5/2018 | Forutanpour | H04N 13/225 |
| 2018/0158230 A1* | 6/2018 | Yan | G06K 9/00268 |
| 2018/0176474 A1* | 6/2018 | Blanco | H04N 5/23293 |
| 2018/0225408 A1* | 8/2018 | Ziolo | G06F 17/50 |
| 2018/0260988 A1* | 9/2018 | Huang | G06T 15/00 |
| 2018/0261001 A1* | 9/2018 | Wang | G06T 7/90 |
| 2018/0373858 A1* | 12/2018 | Farkash | G06F 21/36 |
| 2019/0066349 A1* | 2/2019 | Huang | G06T 15/205 |

OTHER PUBLICATIONS

International Search Report received for PCT Patent Application No. PCT/US2018/020629, dated May 15, 2018, 2 pages.
International Preliminary Report on Patentibility received for PCT Application No. PCT/US2018/020629, dated Sep. 19, 2019, 6 pages.
Partial Supplementary European Search Report received for European Patent Application No. 18764564.3, dated Nov. 7, 2019, 13 pages.
Wikipedia, "3D Reconstruction from Multiple Images," Retrieved from the Internet URL: https://en.wikipedia.org/w/index.php?title=3D_reconstruction_from_multiple_images&oldid=765885475, Feb. 16, 2017, 7 pages.
Goesele et al., "Multi-View Stereo for Community Photo Collections", 11th International Conference on Computer Vision, Oct. 14-21, 2007, 8 pages.
Koch et al., "Realistic 3-D Scene Modeling from Uncalibrated Image Sequences", International Conference on Image Processing, vol. 2, Oct. 24-28, 1999, 500-504 pages.
Koch et al., "Robust Calibration and 3D Geometric Modeling from Large Collections of Uncalibrated Images Center or Processing of Speech and Images", Retrieved from the Internet URL: http://people.inf.ethz.ch/pomarc/pubs/KochDAGM99.pdf, Sep. 1999, 8 pages.
Pollefeys et al., "Metric 3D Surface Reconstruction from Uncalibrated Image Sequences", Structure from Multiple Images of Large-Scale Environments, Smile, vol. 1506, Jun. 6, 1988, pp. 139-154.

* cited by examiner

INTEGRATION OF 3D MODELS

PRIORITY

This non-provisional U.S. patent application claims priority to U.S. provisional patent application, Ser. No. 62/468,748; filed on Mar. 8, 2017 by the same inventors as the present patent application. This present patent application draws priority from the referenced patent application. The entire disclosure of the referenced patent application is considered part of the disclosure of the present application and is hereby incorporated by reference herein in its entirety.

TECHNICAL FIELD

Embodiments of the present disclosure relate to the integration of digital three-dimensional (3D) models in process flows and, more particularly, but not by way of limitation, to use of 3D models in various scenarios.

BACKGROUND

Conventionally, as a user desires to electronically describe or otherwise document an item, the user provides two-dimensional (2D) photos of the item. In some examples, users desiring to describe an item to another user posts photos of the item to a network server so that the other user can view them by retrieving the photos from the network server. Furthermore, as other users analyze the item, they view many photos of the item to determine the condition or other physical properties of the item.

However, in many scenarios, due to the technical limitations of 2D photographs, another user is unable to glean sufficient information about the item using the photographs. In other scenarios, users post inadequate images that fail to disclose certain issues with the item (e.g., scratches, discoloration, damage, modifications, or other non-conventional alterations). In other examples, the user cannot or does not sufficiently describe particular flaws associated with the item.

BRIEF DESCRIPTION OF THE DRAWINGS

Various ones of the appended drawings merely illustrate example embodiments of the present disclosure and cannot be considered as limiting its scope.

Figure 1:
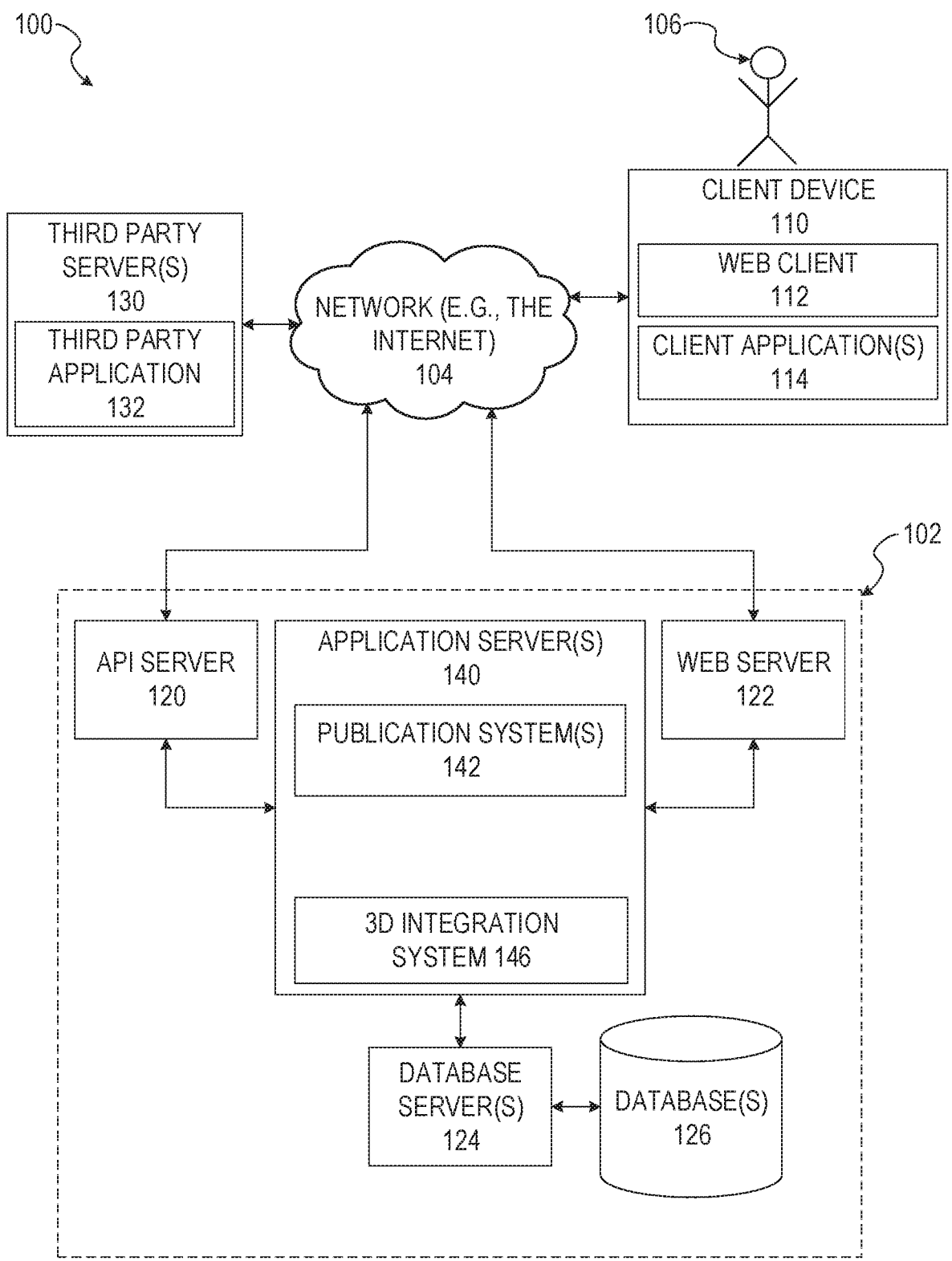
FIG. 1 is a block diagram illustrating a system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In certain embodiments, a system as described herein, is specially configured to retrieve a plurality of images (e.g., either as still images, or a video) from a user. In one example embodiment, a 3D integration system (FIG. 2: 146) requests 20 or more images of the item from varying viewing angles. The 3D integration system 146 then generates a 3D model of the item using the images. In this example, because the 3D model is generated using actual images of the item, the 3D model accurately reflects the physical condition of the item.

In one example embodiment, the 3D integration system 146 generates a 3D model by selecting a few specific points on the item using sets of images. In one example, the 3D integration system groups the images in sets of three. The 3D integration system 146 then triangulates the specific points using sets of images and generates a depth map for each set of images. The 3D integration system 146 then combines the depth maps to create a 3D mesh by calculating depth and projecting out each image onto the 3D mesh. The 3D integration system 146 may then calibrate colors by combining colors from the sets of images using specular and diffuse properties of the colors.

In other example embodiments, the 3D integration system 146 uses Kruppa equations with a minimum of three displacements as one skilled in the art may appreciate. In other examples, the 3D integration system 146 applies stratification using Projective Reconstruction, Affine Reconstruction, or Euclidean Reconstruction as one skilled in the art may appreciate.

In other example embodiment, the 3D integration system 146 applies a known software package to generate the 3D model using the images. Examples of software package that can be configured to generate a 3D model includes, but is not limited to, Sculpteo, Autodesk, 3DSOM, Neitra 3D Pro, 3-Sweep, Agisoft PhotoScan or the like.

In one example embodiment, the item is a car having a specific customization. Examples may include, a spoiler, alternate wheels, original paint, or other modifications. As described herein, because the 3D integration system 146 generates a 3D model of the car, users (e.g., a prospective buyer) may view the car, using the model, at any desired angle without being limited by the specific angles represented in the retrieved images of the car.

In other example embodiment, the 3D integration system 146 uploads the generated 3D model into a database of 3D models. Over time, as many 3D models are uploaded, the 3D integration system 146 may then perform as a catalog of items using the 3D models. Such a catalog of items allows a user to browse multiple items and compare similar items. The 3D integration system 146 may also generate a side-by-side view of multiple 3D models and may sync positions, orientations, etc. of the models as the user changes a view of one of the items.

In one example embodiment, the 3D integration system 146 requests a plurality of images of a user's hands, generates a 3D model of the user's hands, and compares the model with a model of an item, such as gloves, for example. In this example, the 3D integration system 146 determines whether the gloves will fit the user's hands using the dimensions of the model of the gloves as compared with the dimensions of the model of the user's hands. In this way, a user can determine whether an item will fit his/her physique without physically trying on the item.

Similarly, the 3D integration system 146 can determine whether shoes will fit a user's feet. Also, because each shoe manufacturer's shoes vary in size, regardless of designation, a user may more easily determine whether shoes will fit his/her feet before purchasing the shoes. In other examples, the 3D integration system 146 determines fitment of glasses, hats, shirts, pants, dresses, other articles of clothing, or the like.

With reference to FIG. 1, an example embodiment of a high-level client-server-based network architecture 100 is shown. A network system 102 provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), client application(s) 114, executing on the client device 110.

The client device 110 may comprise, but is not limited to, a mobile phone, desktop computer, laptop, personal digital assistant (PDA), smart phone, tablet, ultra-book, netbook, laptop, multi-processor system, microprocessor-based or programmable consumer electronics, game console, set-top box, or any other communication device that a user may utilize to access the network system 102. In some embodiments, the client device 110 may comprise a display module (not shown) to display information (e.g., in the form of user interfaces). In further embodiments, the client device 110 may comprise one or more of a touch screen, accelerometer, gyroscope, camera, microphone, global positioning system (GPS) device, and so forth. The client device 110 may be a device of a user that is used to perform a transaction involving digital items within the network system 102. In one embodiment, the network system 102 is a network-based marketplace that responds to requests for product listings, publishes publications comprising item listings of products available on the network-based marketplace, and manages payments for these marketplace transactions.

One or more users 106 may be a person, a machine, or other means of interacting with the client device 110. In embodiments, the user 106 is not part of the network architecture 100, but may interact with the network architecture 100 via the client device 110 or another means. For example, one or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, messaging application, electronic mail (email) application, an e-commerce site application (also referred to as a marketplace application), and the like. In some embodiments, the client device 110 may include an application that is configured to locally provide the user interface and at least some of the functionalities with the application configured to communicate with the network system 102, on an as needed basis, for data and/or processing capabilities not locally available (e.g., access to a database of items available for sale, to authenticate a user, to verify a method of payment, etc.). Conversely, in other embodiments, the client device 110 may use its web browser to access a site (or a variant thereof) hosted on the network system 102.

In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is then communicated to the network system 102 via the network 104. In this instance, the network system 102, in response to receiving the input from the user 106, communicates information to the client device 110 via the network 104 to be presented to the user 106. In this way, the user 106 can interact with the network system 102 using the client device 110.

An application program interface (API) server 120 and a web server 122 are coupled to, and provide programmatic and web interfaces respectively to, one or more application server(s) 140. The application server(s) 140 may host one or more publication systems 142 which may comprise one or more modules or applications and each of which may be embodied as hardware, software, firmware, or any combination thereof. The application server(s) 140 are, in turn, shown to be coupled to one or more database servers 124 that facilitate access to one or more information storage repositories or database(s) 126. In an example embodiment, the database(s) 126 are storage devices that store information to be posted (e.g., publications) to the publication system(s) 142. The database(s) 126 may also store digital item information in accordance with example embodiments.

A third party application 132, executing on third party server(s) 130, is shown as having programmatic access to the network system 102 via the programmatic interface provided by the API server 120. For example, the third-party application 132, utilizing information retrieved from the network system 102, supports one or more features or functions on a website hosted by the third party.

The publication system(s) 142 may provide a number of publication functions and services to users 106 that access the network system 102. While the publication system 142 is shown in FIG. 1 to both form part of the network system 102, it will be appreciated that, in alternative embodiments, the publication system 142 may form part of a service that is separate and distinct from the network system 102.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The publication system 142, and 3D integration system 146 could also be implemented as stand-alone software programs, which do not necessarily have networking capabilities.

The web client 112 may access the publication system 142 via the web interface supported by the web server 122. The programmatic client accesses the various services and functions provided by the publication system 142 via the programmatic interface provided by the API server 120. The programmatic client may, for example, be a publisher application to enable users to author and manage publications on the network system 102 in an off-line manner, and to perform batch-mode communications between the programmatic client and the network system 102.

In certain example embodiments, the 3D integration system 146 generates the 3D model to be displayed using the web client 112. In one example, the 3D integration system 146 generates the model, stores the model at a remote server, and returns a universal resource locator (URL) to access the model using the web client 112.

Additionally, a third party application(s) 132, executing on a third party server(s) 130, is shown as having programmatic access to the network system 102 via the programmatic interface provided by the API server 120. For example, the third-party application 132, utilizing information retrieved from the network system 102, may support one or more features or functions on a website hosted by the third party.

In one example embodiment, the 3D integration system 146 is configured as a remote service. In this example, the network system 102 receives images of an item, and transmits the images to the 3D integration system 146. The 3D integration system 146 generates the 3D model of the item and transmits the generated 3D model to the network system 102. In another example embodiment, the network system 102 is a networked marketplace and the 3D integration system 146 generates the 3D model to be used in a listing for the item at the networked marketplace.

Figure 2:
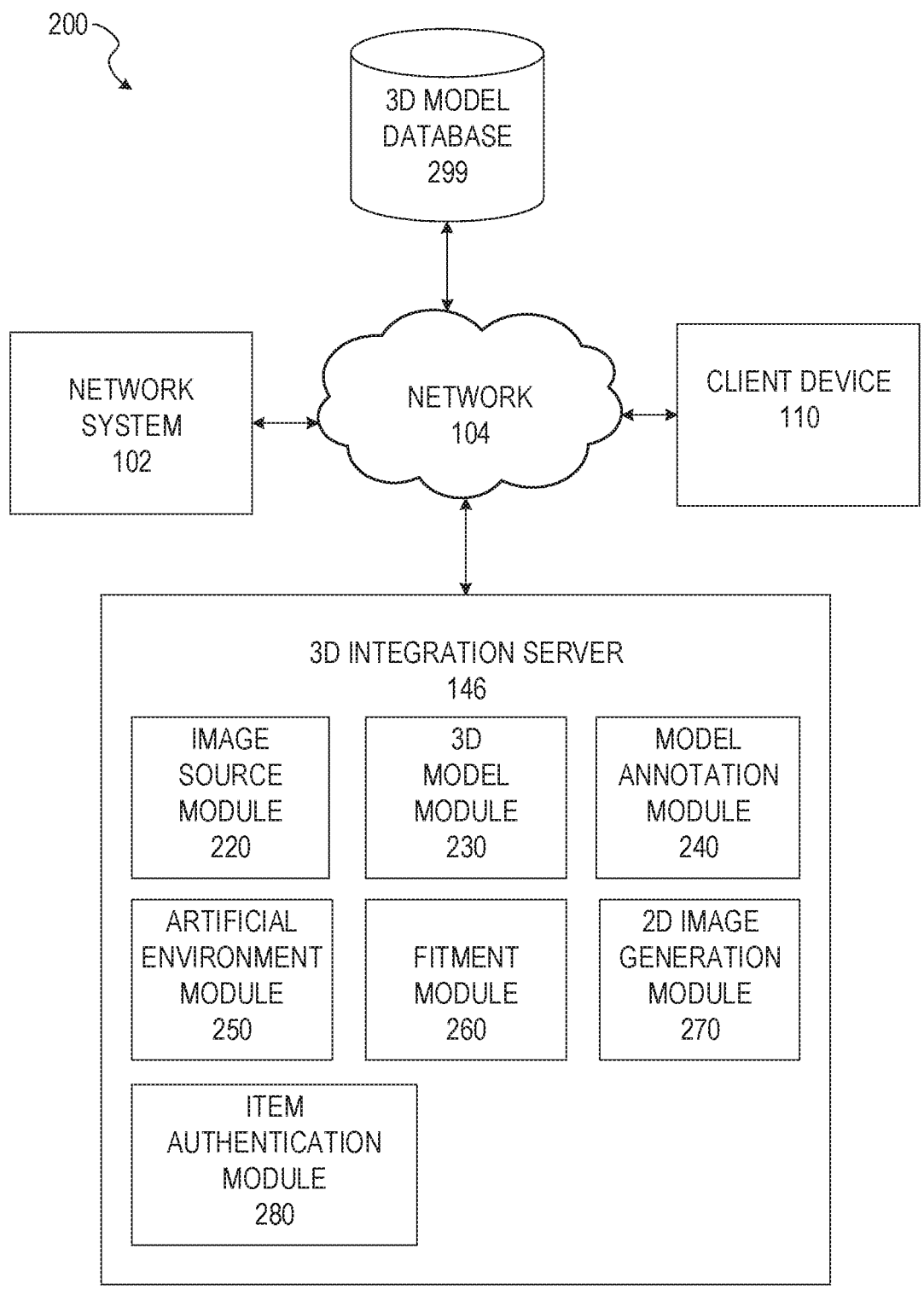
FIG. 2 is an illustration depicting a 3D integration system according to one example embodiment.

FIG. 2 is an illustration depicting a 3D integration system according to one example embodiment. In this example embodiment, the 3D integration system 146 includes an image source module 220, a 3D model module 230, a model annotation module 240, an artificial environment module 250, a fitment module 260, a 2D image generation module 270, and an item authentication module 280.

In one example embodiment, the image source module 220 is configured to retrieve a plurality of images of an item. In one example, the image source module 220 interacts with a user interface that allows a user to upload images of the item and retrieves the images that the user uploaded.

In another example embodiment, the image source module 220 receives a video and extracts still frames of the video into images that will be used to generate the 3D model. The image source module 220 may also extract still frames for each of a plurality of angles of the item. In this way, the image source module 220 ensures that images depict sufficient angles of the item to generate a 3D model that is accurate from many different angles.

In another example embodiment, the image source module 220 receives a video from a camera located on glasses of the user, extracts still images from the video, and transmits the still images to the 3D model module 230.

In one example embodiment, the 3D model module 230 is specially configured to generate a 3D model by combining the retrieved images. The 3D integration server 146 combines the images with image metadata that includes camera properties (e.g., focal properties, etc.), spatial properties, and other environmental factors, to generate a 3D model of the item using the images as described herein. Accordingly, the 3D model module 230 generates a 3D model of the actual item that accurately reflects the physical dimensions of the item.

In another example embodiment, the provided images do not disclose each angle of the item and the 3D model module 230 cannot make a complete model using the images. In response, the 3D model module 230 retrieves portions of another model (or stock images of a like item from missing angles) that describes the item and uses those portions to complete the generated 3D model of the item. In another example embodiment, the 3D model module 230 retrieves stock images of the item to be used to generate the 3D model. In one example, the item is shoes and the images show each angle of the shoes except the heel of the shoes. Because the 3D model module 230 has no images of the heel of the shoes, the 3D mode module 230 retrieves the heel of similar shoes from another model of like shoes. In this example embodiment, the 3D model module 230 shades, or otherwise, marks the portion of the image that came from the other model to distinguish that portion from the portion of the 3D model generated from the images.

In another example embodiment, the 3D model module 230 receives images that such poor quality (e.g., blurry, low resolution, technical issues with the image, item obstructed, etc.) such that accurate information to generate the 3D model cannot be extracted. In this example, as with the previous one, the 3D model module 230 retrieves a portion of a 3D model (or stock images of the item to replace the ones that are poor quality) from a stock 3D model to complete missing portions of the item. In one specific example, the 3D model module 230 retrieves physical dimensions for the item model using portions of the stock 3D model and colors the added portions using colors from the received images.

In certain examples, the 3D model module 230 determines that an image is blurry by computing a Fourier Transform for the image and determining whether the number of high frequencies of the image are below a threshold number. Of course, one skilled in the art may recognize other ways to determine whether the blurriness of an image is above a threshold amount and this disclosure is not limited in this regard.

In one example embodiment, the model annotation module 240 is configured to provide a user interface allowing a user to annotate the generated 3D model. In one example, the model annotation module 240 displays the 3D model and receives a click from the user at a given point on the 3D model. The model annotation module 240 then opens a dialog allowing the user to input information to be stored and associated with the point on the 3D model where the user clicked. In this way, the model annotation module 240 allows a user to assign textual information to specific points on the 3D model.

In another example embodiment, the model annotation module 240 asks the user whether they would like to annotate the 3D model. In one example, the model annotation module 240 displays a yes/no question via a user interface and allows annotation of the 3D model in response to an affirmative selection by the user.

In another example, the artificial environment module 250 is configured to insert the 3D model into a 3D environment. In one example, the item is placed in a virtual table in a 3D environment. In this way, the item may be presented in a more aesthetic environment without distractions from other items or background imagery, or the like. This may make the item more attractive to others users that view the item. In another specific example, the 3D model of a car is put in a sunny curvy road which allows another user to see the item in a more attractive state.

In one example embodiment, the artificial environment module 250 is configured to combine the 3D model of the item with a 3D model of a person. In one example, the artificial environment module 250 places a 3D model of glasses on the face of a 3D model of a person. In the same way, the 3D model module 230 makes a 3D model of an item, the 3D model module 230 may also make a 3D model of a user based, at least in part, on images of the user. In another example embodiment, the artificial environment module 250 places (in a virtual environment) a 3D model of a hat on the head of the 3D model of a person.

In another example embodiment, the artificial environment module 250 crops out a portion of the images that include the item to remove background imagery. In this way, the images used to generate the 3D model strictly include imagery of the item without additional imagery.

In another example embodiment, the artificial environment module 250 determines that the item to be used to generate the 3D model is an item in the center of each picture. In one example embodiment, the user indicates that a "backpack" is being sold, and the artificial environment module 250 analyzes each image, using one or more computer vision algorithms, to identify the "backpack" in each of the images. The artificial environment module 250 then, for each image, traces around the identified item to separate the pixels in the image that depict the item, and other pixels in the image that do not depict any portion of the item. In this way, the artificial environment module 250 then, more easily, generates a 3D model of the item because the modified images only include pixels that depict the item.

In one example embodiment, the fitment module 260 is configured to determine the physical dimensions of the item according to the 3D model of the item. Because the 3D model of the item is physically accurate, the fitment module 260 determines the size of the item by digitally measuring the 3D model of the item. The fitment module 260 then determines a minimally sized bounding box that encloses the item based, at least in part, on the physical dimensions of the item and the physical dimensions of a theoretical digital bounding box. In another example embodiment, the fitment module 260 selects a box from a set of boxes that is capable of enclosing the item. Accordingly, the fitment module 260 determines a specific box that can be used to ship the item.

In another example embodiment, the fitment module 260 determines whether an article of clothing fits on a person by, digitally comparing the 3D model of the article of clothing with 3D model of a portion of the person. In one example, the article of clothing is a pair of shoes and the fitment module 260 compares the 3D model of the shoes with a 3D model of the person's feet. In response to the shoes being capable of enclosing the person's feet, according to the 3D models in a 3D environment, the fitment module 260 notifies the person that these shoes represented by the 3D model fit the person. Furthermore, in response to the 3D model of the person's shoes not being able to enclose the person's feet, according to the 3D environment, the fitment module 260 notifies the person that the shoes represented by the 3D model do not fit the person's feet.

In one example embodiment, the 2D image generation module 270 is configured to generate a 2D image of the item according to a specific view of the 3D model in a virtual 3D environment. In certain example embodiment, the 2D image generation module 270 alters a background texture in a 3D virtual environment and generates a 2D image of the image with the altered background texture. In other examples, the 2D image generation module 270 generates specific images of an item at predetermined angles, viewpoints, backgrounds, or the like.

In one example, the 2D image generation module 270 receives a set of angles from which to generate 2D images of an item. For example, a set of angles for a car may include each corner at 45 degrees, etc. Therefore, in response to receiving images of the car, and generating the 3D model of the car, the 2D image generation module 270 may rotate the 3D model of the car at each specific angle, and generate a set of 2D images. In this example, because a user may not be aware of specific angles that more optimally describe an item, the user simply takes images of the item, and the 2D image generation module 270 generates a set of 2D images (using a generated 3D model using the received images) that are more effective in depicting the item in a listing at the networked marketplace. The specific angles may be determined using a statistical analysis of similar items sold at the networked marketplace including the specific angles used in listings for those similar items.

Another benefit of making 2D images include depicting the item to a user by transmitting a few 2D images of the item instead of a 3D model of the item. In another example, in response to determining that a client device for a user cannot display a 3D model, the 2D image generation module 270 transmits 2D images of the item instead of the 3D model of the item. In one specific example embodiment, the 2D image generation module 270 retrieves, from a remote electronic database, a set of optimal image angles for an item, and generates images from those angles. In this way, as selling strategies develop, the 2D image generation module can generate images from items that may more optimally sell the item, according to the remote electronic database of optimal angles, colors, backgrounds, item scenarios, situations, or the like.

In another example embodiment, the 2D image generation module 270 increases a brightness of the 3D model by increasing an artificial light source in a 3D virtual environment and generating a 2D image of the item using the brighter virtual light source. This may be in response to 2D images of the item being below a threshold brightness, but of course, this is not necessarily the case.

In one example embodiment, the item authentication module 280 is configured to authenticate an item based, at least in part, on virtual measurements of the item according to the 3D model of the item compared with virtual measurements of an authentic item according to a 3D model of the authentic item.

In one example, the photos are allegedly of an authentic Louis Vitton® Handbag. The 3D integration system 146 compares the 3D model of the allegedly authentic handbag (e.g., using images provided by a user) with an authentic 3D model of a Louis Vitton® Handbag. In certain embodiments, the 3D integration system 146 compares dimensions of the allegedly authentic handbag from the user with the authentic one. In response to detecting dimensions that are inconsistent with dimensions of the authentic 3D model, the 3D integration system determines that the item is not an authentic Louis Vitton® Handbag. Specifically, the authentication module 280 measures a distance from one corner of the 3D model to another and compares distance to a distance from the same corners of the authentic 3D model. The authentication module 280 may also measure a distance between other predetermined points of the authentic 3D model and this disclosure is not limited in this regard. The authentication module 280 may also analyze patterns, or other features of the items to ensure authenticity (e.g., if the patterns on the item do not match authentic patterns, the authentication module 280 determines that the item is not authentic.

In certain embodiments, the 3D integration system 146 stores received 3D models in a 3D model database 299. Over time, as many 3D models are stored the 3D integration system 146 may provide one or more of the 3D models to a user in response to the user desiring to compare one model with another. The 3D integration system 146 may allow the user to rotate or manipulate the 3D model in certain ways, and correspondingly manipulate the 3D model of the comparison item. In this way, the user is presented with the two separate models for comparison but is consistently shown the same viewpoint for each of the models.

Figure 3:
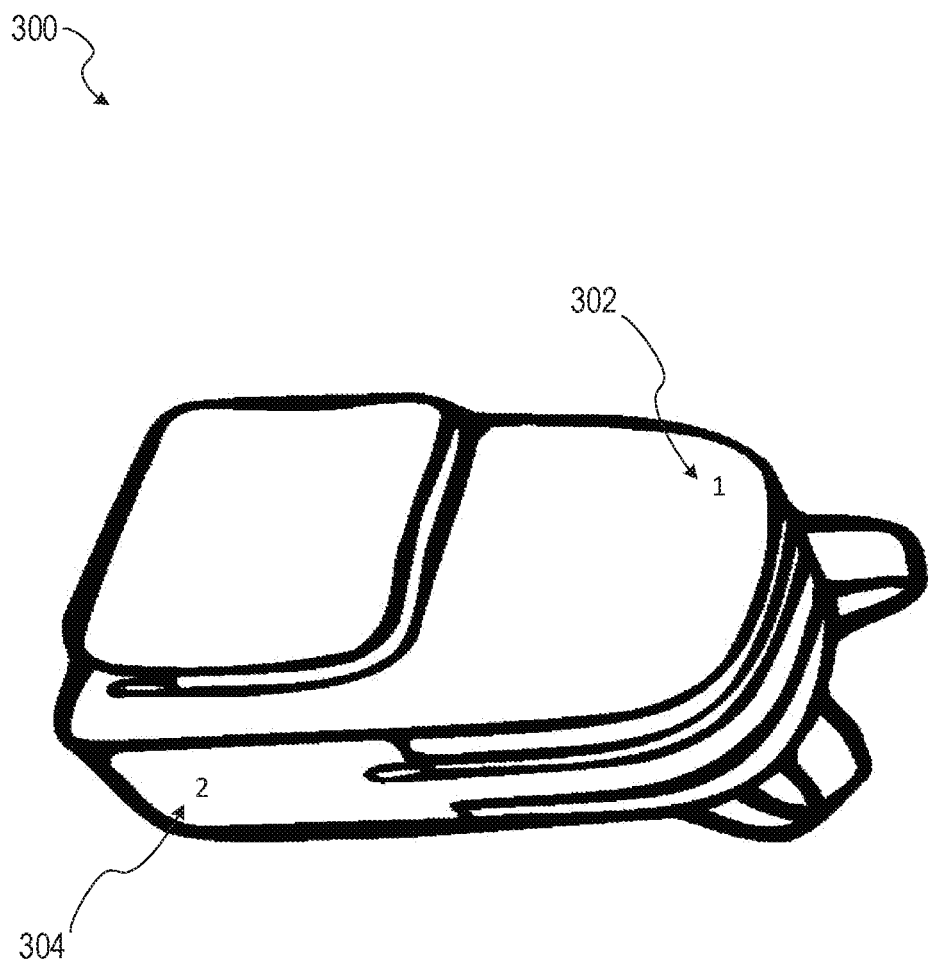
FIG. 3 is an illustration depicting a user interface for a 3D model, according to another example embodiment.

FIG. 3 is an illustration depicting a user interface 300 for a 3D model, according to another example embodiment. In this user interface 300 the 3D model is presented to the user allowing the user to select a point on the model.

In response, the model annotation module 240 provides an input text box for the user to insert text that will be associated with the selected point. In one example, the 3D model is of a car, and the user selects a point on the 3D model at a location for a scratch on the car. In response to being shown a text input box, the user may then describe the scratch, or provide any other useful information related to the car. In this way, the user may more accurately describe features of the item by annotating points of the 3D model of the item.

In this example, the user selects a point 302 and the 3D integration system 146 requests that the user provide the information to be associated with the selected point. In other examples, the user selects point 304 and provides additional information. The 3D integration system 146 may receive any number of selections from the user allowing the user to document each feature of an item, if desired.

Figure 4:
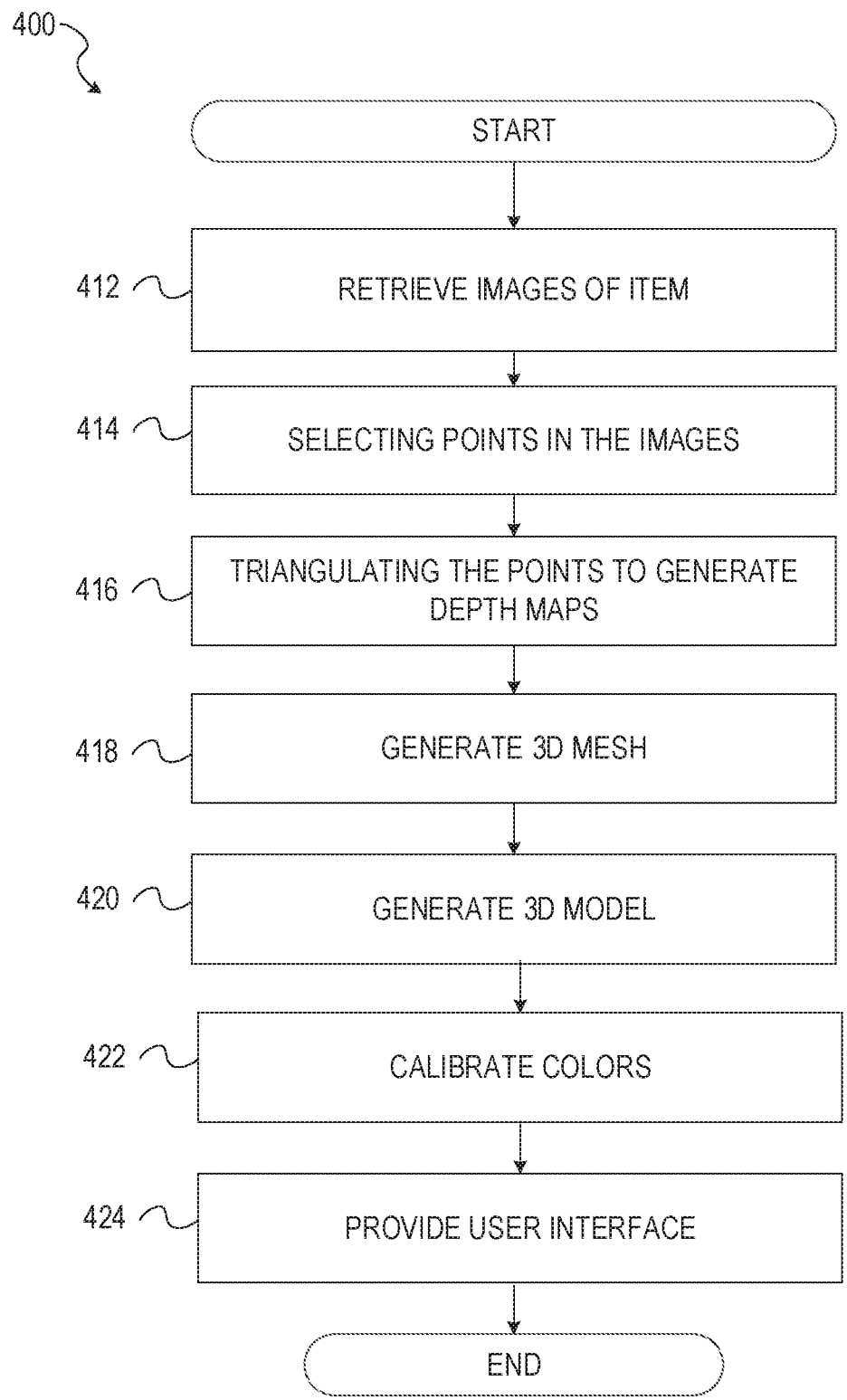
FIG. 4 is a flow chart diagram illustrating a method for integrating a 3D model according to one example embodiment.

FIG. 4 is a flow chart diagram illustrating a method for integrating a 3D model according to one example embodiment. Operations in the method 400 may be performed by the 3D integration server 146, using modules described above with respect to FIG. 2.

In one example embodiment, the method 400 begins and at operation 412, the image source module 220 receives images of an item. In one example, the image source module 220 receives images uploaded via a client device using a web based interface.

The method 400 continues at operation 414 and the 3D model module 230 selects one or more points in the images. For example, the 3D model module 230 may also divide up the images in sets as previously described. In certain examples, the 3D model module 230 selects end points of the item, corner points of the item, feature points (e.g., handles, buttons, zippers, wheels, or any other distinguishing point), or other points.

The method 400 continues at operation 416 and the 3D model module 230 triangulates each point in the images that include that point to generate a depth map for each set of images. The method 400 continues at operation 418 and the 3D model module 230 combines the depth maps into a 3D mesh. The method 400 continues at operation 420 and the 3D model module generates a 3D model by projecting the images onto their respective depth maps on the 3D mesh.

The method 400 continues at operation 422 and the 3D integration system 146 calibrates colors in the 3D model by combining colors from the sets of images using specular and diffuse properties of the colors. The method 400 continues at operation 424 and the model annotation module 240 interacts with the user to retrieve one or more annotations to be applied to the 3D model.

In one example embodiment, the 3D model module 230 causes display of the 3D model using a user interface and accepts an indicator indicating a specific location on a surface of the 3D model. In one example, the indicator is a click at a specific point on the 3D model. In another example, the indicator is 3D coordinates that define a specific point in the 3D model.

In another example embodiment, the 3D annotation module 240 receives one or more annotations to be applied to the 3D model. In one example, the annotations include a comment regarding damage to the item. In this example, the 3D annotation module 240 adds a point on a 3D surface of the item for each of the provided annotations. In response to a user selecting the point, the 3D annotation module 240 displays the annotation associated with the point. In one example, the 3D annotation module 240 opens a text box and populates the text box with textual annotation data.

In one example embodiment, the 3D annotation module 240 adds the annotations to the 3D model of the item. In one example, the 3D annotation module 240 incorporates the annotation data into the 3D model by providing a location (at the 3D model) for the annotation and virtually attaching the annotation to the specific point associated with the annotation.

In another example embodiment, the 3D integration system 146 returns a URL to the annotated 3D model so that a web client downloads the 3D model when viewing a web page that displays the item. In this example, a user provides annotations on the 3D model, and another user may view the item in a 3D virtual environment that includes the annotations.

Figure 5:
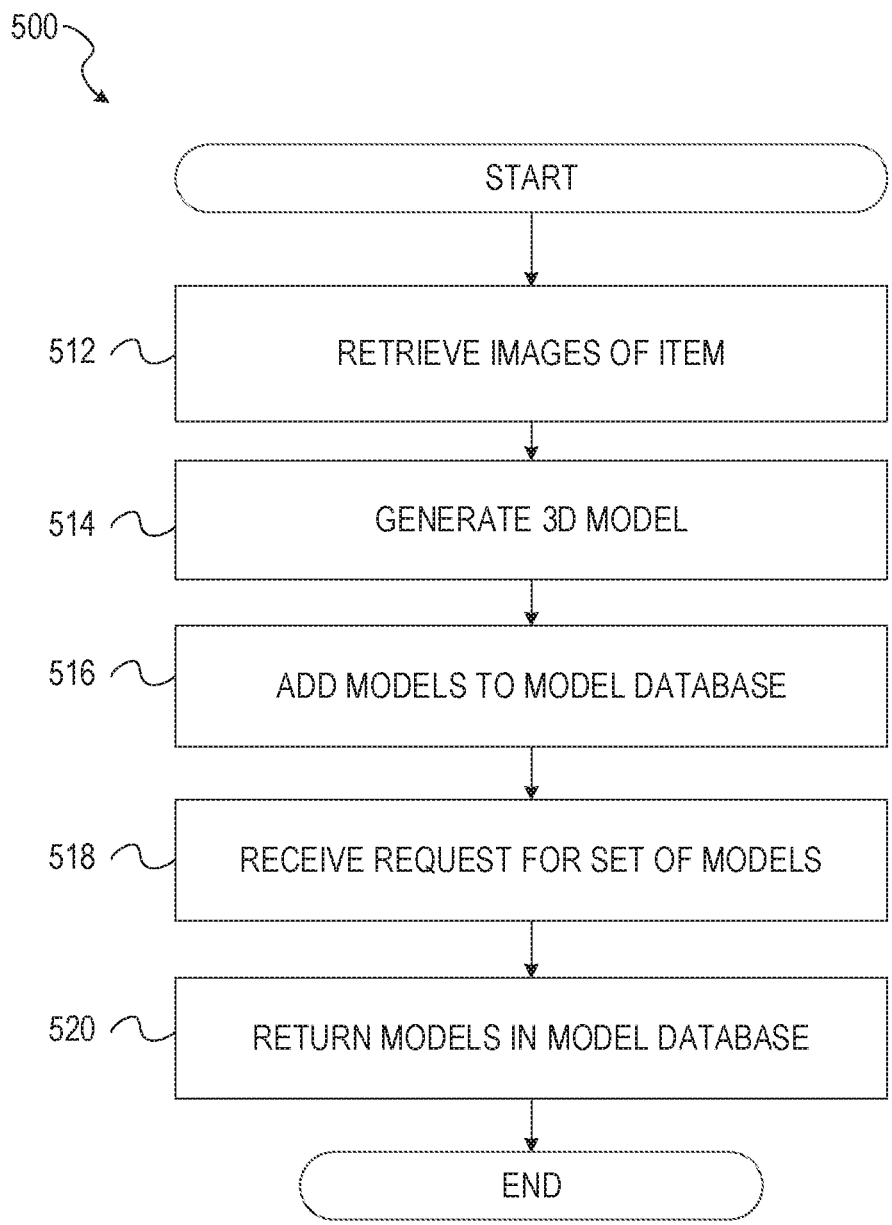
FIG. 5 is a flow chart diagram illustrating another method for integrating a 3D model according to one example embodiment.

FIG. 5 is a flow chart diagram illustrating another method 500 for integrating a 3D model according to one example embodiment. Operations in the method 500 are performed by the 3D integration server 146, using modules described above with respect to FIG. 2.

In one example embodiment, the method 500 begins and at operation 512 the image source module 220 receives images of an item. In one example, the image source module 220 retrieves images stored at a remote server by requesting the images located at the remote server that are located in a specific directory.

The method 500 continues at operation 514 and the 3D model module 230 generates a 3D model of the image, using the images of the item and as described in method 400, operations 414 through 422. The method 500 continues at operation 516 and the 3D model module 230 queries the 3D model database 299 to determine whether a 3D model of the item, or a substantially similar item is currently stored in the 3D model database 299.

In one example embodiment, substantially similar includes an item in the 3D model database 299 that is the same make and model as the item. For example, in response to generating a 3D model of a portion of an oven, substantially similar includes other ovens made by the same company and having the same model number.

The 3D model module 230 queries the 3D model database 299 to determine whether a substantially similar version of the item is already in the database 299. In response to there being no substantially similar 3D model, the 3D model module 230 adds the generated 3D model to the 3D model database 299. In other embodiments, the 3D model module 230 also includes indexing information, item properties, such as, but not limited to, size, color, color patterns, item condition, or the like. In other embodiments, substantially similar includes items having the same make and model and including a same condition (e.g., poor, broken, average, excellent, new, etc.).

The method 500 continues at operation 518 and the 3D model module 230 receives a request for a set of models. In one example, the set of models includes two similar models for comparison. In one specific, non-limiting example, the set of models includes two different microwave ovens. In response, the 3D model module 230 returns the requested 3D models that are in the 3D model database 299.

Figure 6:
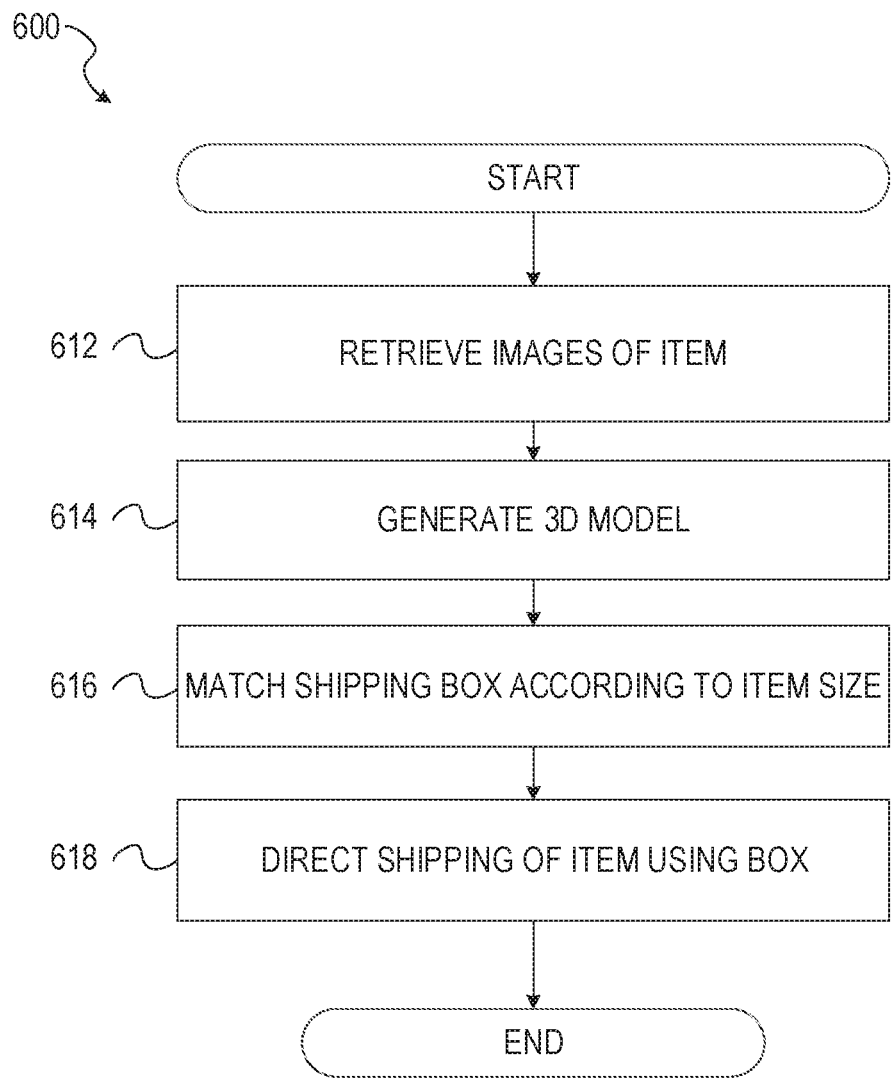
FIG. 6 is a flow chart diagram illustrating a method for integrating a 3D model according to another example embodiment.

FIG. 6 is a flow chart diagram illustrating a method 600 for integrating a 3D model according to another example embodiment. Operations in the method 600 may be performed by the 3D integration system 146, using modules described above with respect to FIG. 2.

In one example embodiment, the method 600 begins and at operation 612 the image source module 220 retrieves images of an item as described herein. The method 600 continues at operation 614 and the 3D model module 230 generates a 3D model of the image, using the images of the item and as described in method 400, operations 414 through 422.

The method 600 continues at operation 616 and the fitment module 260 identifies a minimally bounding shipping container that encloses the item. In one example, in response to the item being more than 4 feet long, but only 6 inches deep and wide, the fitment module 260 identifies a box that is more than 4 feet long, more than 6 inches deep, and more than 6 inches wide. Furthermore, the fitment module 260 identifies the smallest box available that encloses the item.

In one example, the fitment module 260 generates a 3D model of a largest box using the physical dimensions of the box, places the 3D model of the item at a center point within the 3D model of the box, then orients the 3D model of the item at varying degrees (e.g., at 30 degree intervals of longitude and 30 degree intervals of latitude). In response to any one of the orientations being completely enclosed by the box, the fitment module 260 selects a next smaller box.

The fitment module 260 then applies the same steps to the next smaller box. Again, if the item (at any orientation) fits within the box, the fitment module 260 selects the next smaller box. In response to none of the orientations causing the item to be completely enclosed in the box, the fitment module 260 reverts to the last box that did completely enclose the item. The fitment module 260 then determines that this previous box is the smallest box that could completely enclose the item (at the correct orientation that previously enclosed the box). Accordingly, the fitment module 260 determines a size of a container needed to enclose the item.

The method 600 continues at operation 616 the fitment module 260 directs shipping of the item using the identified box or shipping container. In one example, the fitment module 260 identifies the box, an amount of filler materials based, at least in part, on an amount of space not filled by the item, and transmits the box, filler materials, destination address, to a shipping service that package the item according to the directions. In one example, the amount of space is determined by subtracting a volume occupied by the item from the volume of the selected container.

In other embodiments, the fitment module 260 simultaneously transmits shipping directions for multiple items to a shipping service and summarizes the shipping container requirements so that the shipping service can verify adequate supply of shipping containers.

Figure 7:
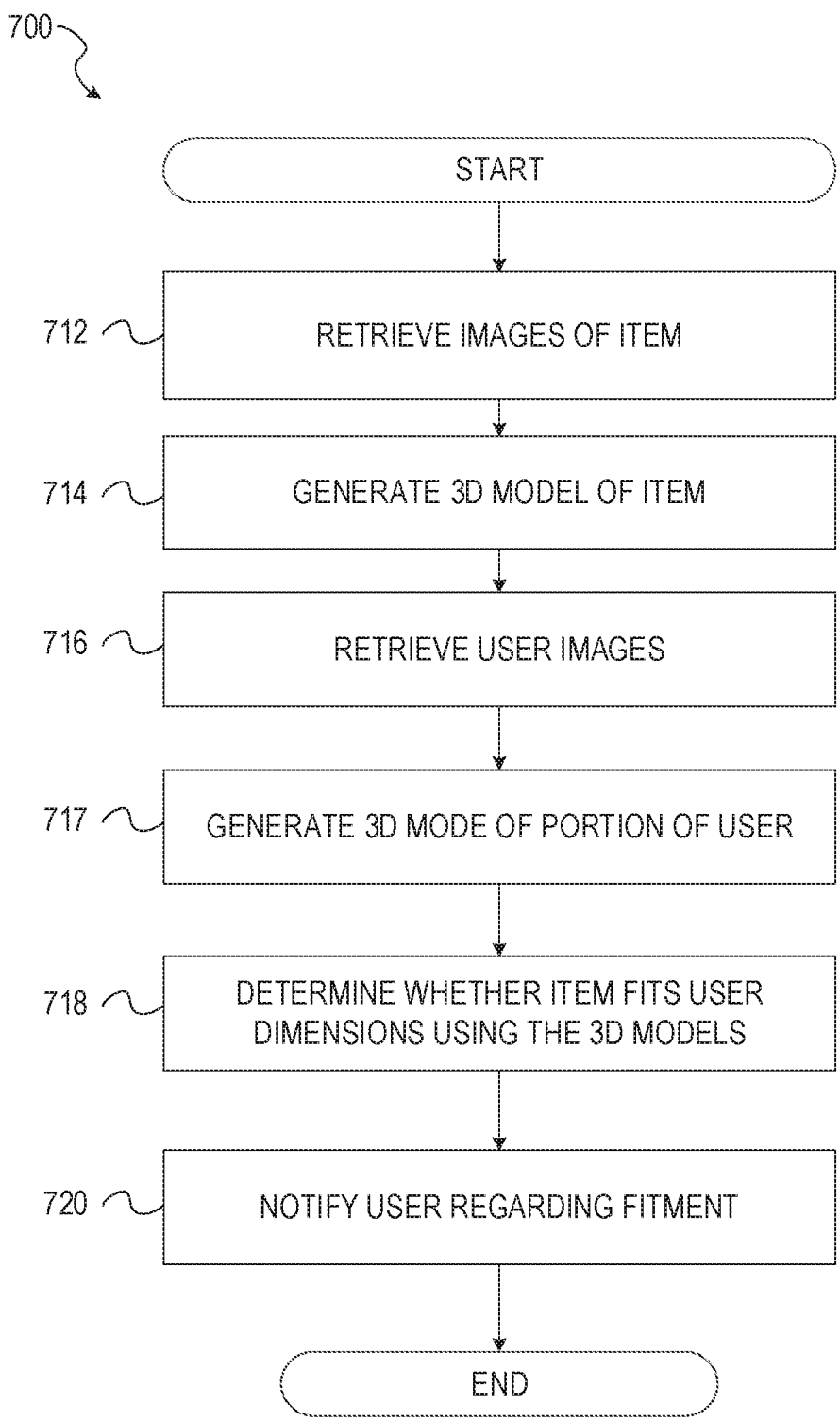
FIG. 7 is a flow chart diagram illustrating a method for integrating a 3D model according to one example embodiment.

FIG. 7 is a flow chart diagram illustrating a method 700 for integrating a 3D model according to one example embodiment. Operations in the method 700 are performed by the 3D integration system 146, using modules described above with respect to FIG. 2.

In one example embodiment, the method 700 begins and at operation 712 the image source module 220 retrieves images of an item. The method 700 continues at operation 714 and the 3D model module 230 generates a 3D model of the image, using the images of the item and as described in method 400, operations 414 through 422.

The method 700 continues at operation 716 and the fitment module 260 retrieves images of a portion of a user and the 3D model module 230 generates a 3D model of that portion of the user using the images of the portion of the user and as described in method 400, operations 414 through 422. In one example, the fitment module 260 requests that the user provide a set of images of the user's hands. In response, the 3D model module 230 generates a 3D model of the user's hands.

The method 700 continues at operation 718 and the fitment module 260 determines (having information regarding the physical size of the item and physical dimensions of the portion of the user) whether the item fits the portion of the user by combining the 3D model of the item in a virtual environment with the 3D model of the portion of the person. The fitment module 260 then manipulates the 3D model of the item, or the portion of the person, to determine whether the item fits the portion of the person as previously described.

In one example embodiment, the fitment module 260 combines a 3D model of gloves and a 3D model of the person's hands, manipulates the two 3D models attempting to move the person's hands inside the gloves (in the virtual 3D environment). In response to the item being able to enclose the portion of the person, the method 700 continues at operation and the fitment module 260 notifies the person that the items would fit. In response to the item not being able to enclose the portion of the person, the fitment module 260 notifies the person that the item does not fit the portion of the person.

Figure 8:
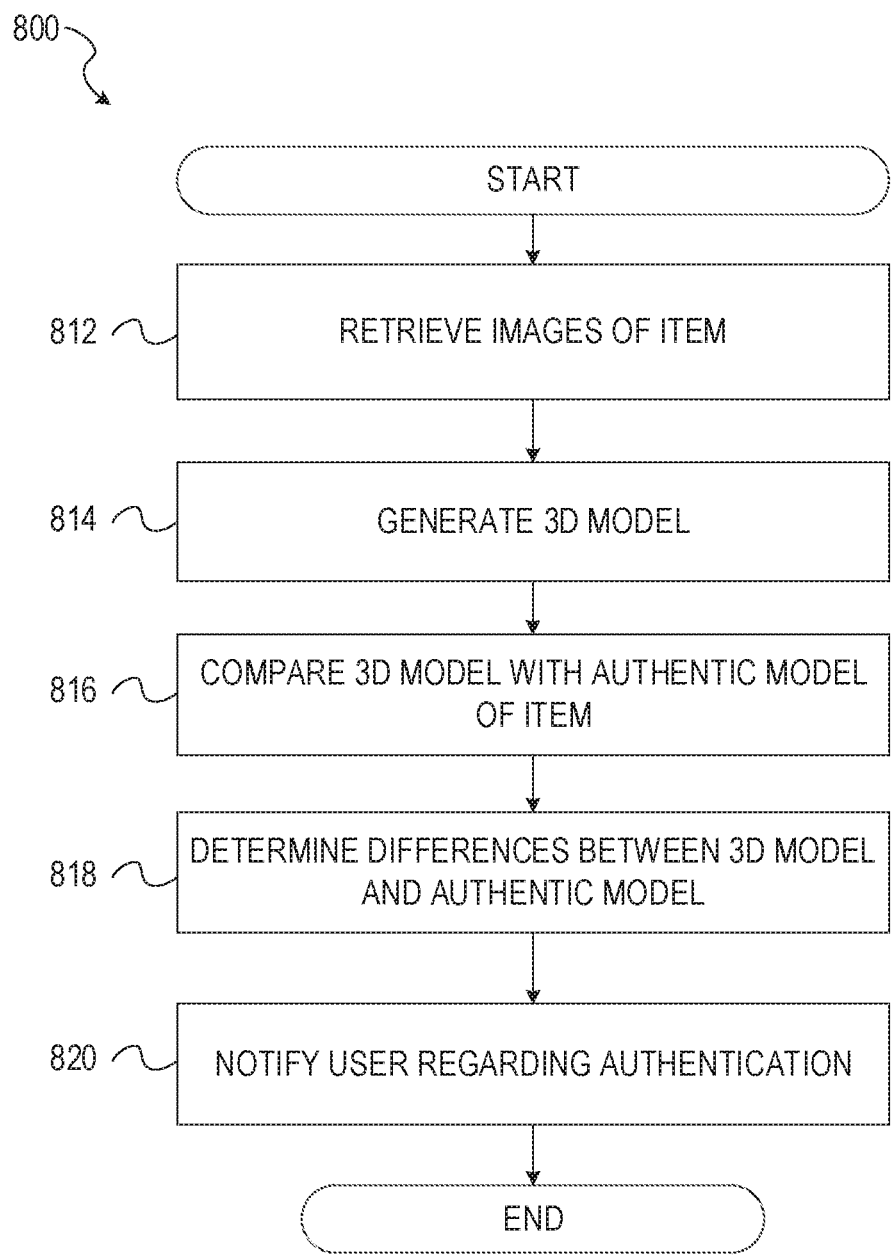
FIG. 8 is a flow chart diagram illustrating another method for integrating a 3D model according to one example embodiment.

FIG. 8 is a flow chart diagram illustrating another method 800 for integrating a 3D model according to one example embodiment. Operations in the method 800 may be performed by the 3D integration system 146, using modules described above with respect to FIG. 2.

In one example embodiment, the method 800 begins and at operation 812 the image source module 220 retrieves images of an item. As a user manipulates a user interface to submit the images, the user interface may request that the user provide images of the item in different ways. In one example, the user interface is configured to request 20 or more images of the item from varying angles, thus providing images from enough different viewpoints to generate a 3D model of the item. The method 800 continues at operation 814 and the 3D model module 230 generates a 3D model of the image, using the images of the item and as described in method 400, operations 414 through 422.

The method 800 continues at operation 816 and the item authentication module 280 compares the generated 3D model of the item with a 3D model of an authentic version of the item. In one example, the user describes the item as an authentic Rolex™ Watch. The item authentication module 280 then measures distances between various points or features of the allegedly authentic item with similar distances of an authentic Rolex™ watch.

In one example embodiment, the item authentication module 280 measures a distance from a bar located at the "1" position, to a bar located at the "7" position on the face of the watch. The item authentication module 280 may also measure the size of bars at various numerical positions, icon sizes on the face of the watch, color similarity, color patterns, band sizes, or other physical properties of the item (e.g., the allegedly authentic watch).

The method 800 continues at operation 818 and the item authentication module 280 determines whether there are differences between the 3D model of the allegedly authentic item and a 3D model of a known authentic item.

The method 800 continues at operation 820 and the item authentication module 280 notifies the user if there is more than a 5% threshold difference in any measurement. Similarly, if there is less than a 5% threshold difference in all of the measurements, then the item authentication module 280 declares that the item is authentic. Of course, other threshold values may be used and this disclosure is not limited in this regard.

In another example embodiment, the item authentication module 280 retrieves a list of predetermined measurements to authenticate an item. For example, in response to an item being an allegedly authentic skateboard (e.g., a specific brand of skateboard), the item authentication module 280 retrieves a list of dimensions to measure by querying a remote database over a network connection. In response to the measurements being consistent with a known authentic version of the skateboard, the item authentication module 280 declares the skateboard to be authentic.

Machine and Software Architecture

The modules, methods, applications and so forth described in conjunction with FIGS. 1-8 are implemented in some embodiments in the context of a machine and associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the inventive subject matter in different contexts from the disclosure contained herein.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 9:
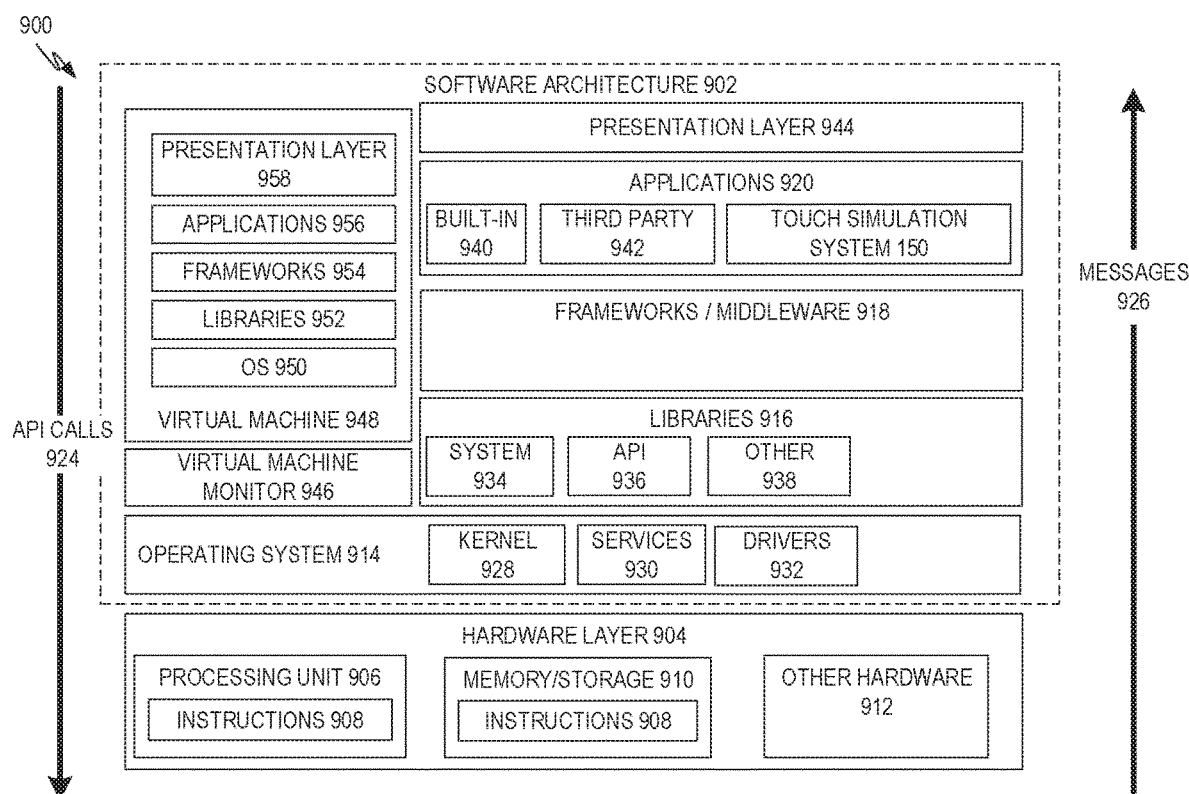
FIG. 9 is a block diagram illustrating an example of a software architecture that may be installed on a machine, according to some example embodiments.

FIG. 9 is a block diagram illustrating an example of a software architecture 900 that may be installed on a machine, according to some example embodiments. The software architecture 900 may be used in conjunction with various hardware architectures herein described. FIG. 9 is merely a non-limiting example of a software architecture and it will be appreciated that many other architectures may be implemented to facilitate the functionality described herein. The software architecture 900 may be executing on hardware such as machine 1000 of FIG. 16 that includes, among other things, processors 1010, memory 1030, and I/O components 1050. A representative hardware layer 904 is illustrated and can represent, for example, the machine 1000 of FIG. 10. The representative hardware layer 904 comprises one or more processing units 906 having associated executable instructions 908. Executable instructions 908 represent the executable instructions of the software architecture 902, including implementation of the methods, modules, and so forth of FIGS. 1-8. Hardware layer 904 also includes memory and/or storage modules 910, which also have executable instructions 908. Hardware layer 904 may also comprise other hardware as indicated by 912, which represents any other hardware of the hardware layer 904, such as the other hardware illustrated as part of machine 1000.

In the example architecture of FIG. 9, the software 902 may be conceptualized as a stack of layers where each layer provides particular functionality. For example, the software 902 may include layers such as an operating system 914, libraries 916, frameworks/middleware 918, applications 99, and presentation layer 922. Operationally, the applications 920 and/or other components within the layers may invoke API calls 924 through the software stack and receive a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. In one specific embodiment, the various modules of the 3D integration system 146 are implemented as an application 920. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and/or three dimensional graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform. In one example embodiment, at least a portion of the 3D integration system 146 is implemented as middleware. In one example, the 3D model module 230 is implemented as middleware and is accessible by any application 920.

The applications 920 include built-in applications 940 and/or third party applications 942. Examples of representative built-in applications 940 may include, but are not limited to, a contacts application, a browser application, a book reader application, a location application, a media application, a messaging application, and a game application, or other, or the like. Third party applications 942 may include any of the built in applications as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 942 may invoke the API calls 924 provided by the mobile operating system such as operating system 914 to facilitate functionality described herein.

The applications 920 may utilize built in operating system functions (e.g., kernel 928, services 930, and/or drivers 932), libraries (e.g., system 934, APIs 936, and other libraries 938), frameworks/middleware 918 to create user interfaces to interact with users of the system. Alternatively, or additionally, in some systems, interactions with a user may occur through a presentation layer, such as presentation layer 944. In these systems, the application/module "logic" can be separated from the aspects of the application/module that interact with a user.

Figure 10:
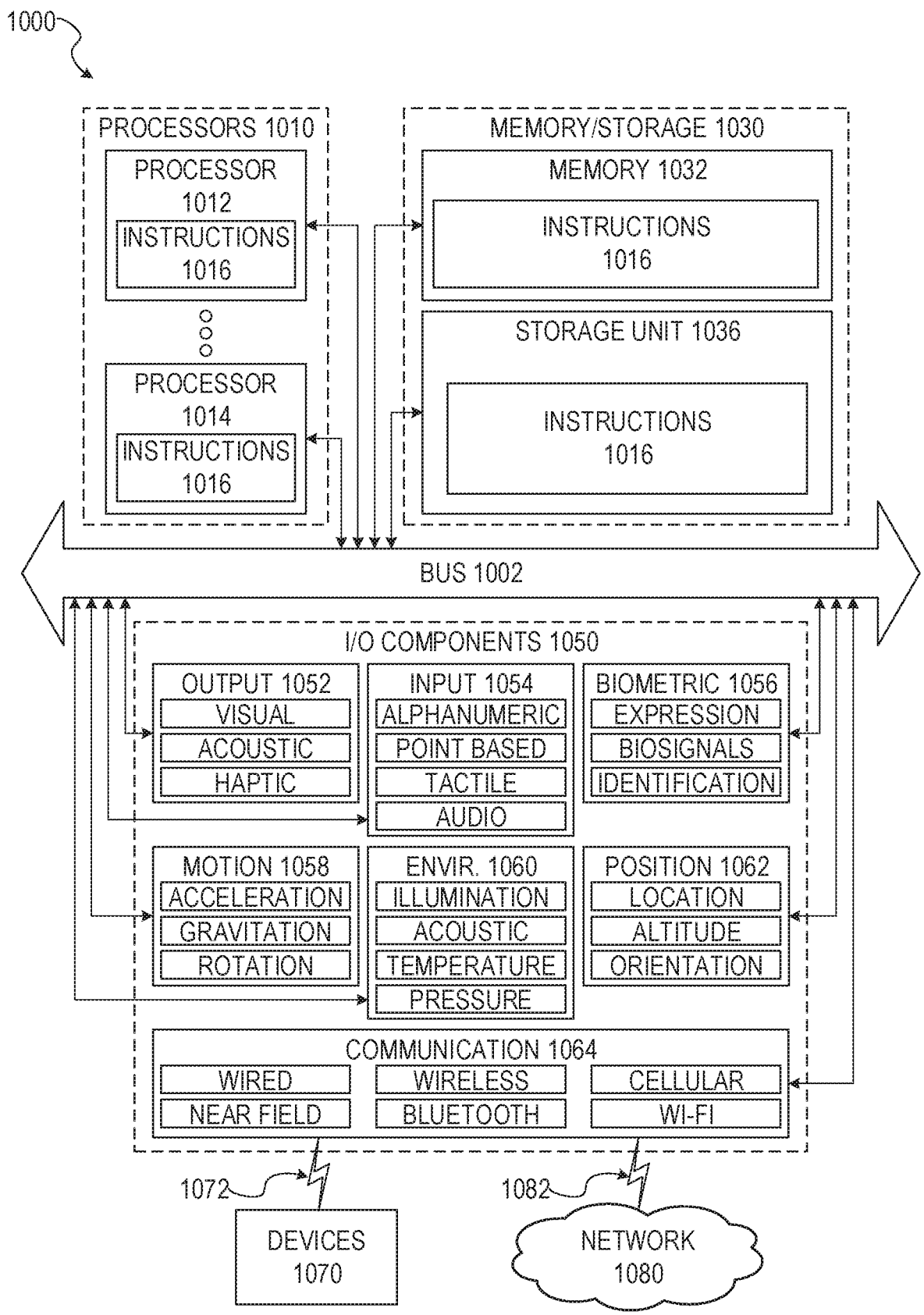
FIG. 10 illustrates a diagrammatic representation of a machine in the form of a computer system within which a set of instructions may be executed for causing the machine to perform any one or more of the methodologies discussed herein, according to an example embodiment.

Some software architectures utilize virtual machines. In the example of FIG. 9, this is illustrated by virtual machine 948. A virtual machine creates a software environment where applications/modules can execute as if they were executing on a hardware machine (such as the machine of FIG. 10, for example). A virtual machine is hosted by a host operating system (operating system 914 in FIG. 9) and typically, although not always, has a virtual machine monitor 946, which manages the operation of the virtual machine as well as the interface with the host operating system (i.e., operating system 914). A software architecture executes within the virtual machine such as an operating system 950, libraries 952, frameworks/middleware 954, applications 956 and/or presentation layer 958. These layers of software architecture executing within the virtual machine 948 can be the same as corresponding layers previously described or may be different Example Machine Architecture and Machine-Readable Medium FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed.

For example the instructions may cause the machine to execute the flow diagrams of FIGS. 4-8. Additionally, or alternatively, the instructions may implement the modules depicted in FIG. 2. Specifically, the instructions 1016 may implement the various functions of the image source module 220, the 3D model module 230, the model annotation module 240, the artificial environment module 250, the fitment module 260, the 2D image generation module 270, and the item authentication module 280.

The instructions transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 1012 and processor 1014 that may execute instructions 1016. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072, respectively. For example, the communication components 1064 may include a network interface component or other suitable device to interface with the network 1080. In further examples, communication components 1064 may include wired communication components, wireless communication components, cellular communication components, Near Field Communication (NFC) components. Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1080 may be an ad hoc network, an intranet, an extranet, a VPN, a LAN, a WLAN, a WAN, a WWAN, a (MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A computer-implemented method comprising:
   receiving, via a network interface, a plurality of two-dimensional images of an item;
   selecting specific points on the item that are depicted in two or more of the two-dimensional images;
   triangulating the specific points to generate a plurality of depth maps;
   generate a three-dimensional mesh by combining the plurality of depth maps;
   generating a three-dimensional model of the item by projecting the plurality of two-dimensional images onto the three-dimensional mesh using the specific points;
   calibrating colors used in the three-dimensional model using specular and diffuse properties of colors in the plurality of two-dimensional images;
   in response to determining that the three-dimensional model is incomplete, incorporating a portion of a second model of the item to complete the three-dimensional model;
   displaying, in a user interface, a visual indicator that distinguishes a first portion of the three-dimensional model that has been completed based on the received plurality of two-dimensional images of the item from a second portion of the three-dimensional model generated from the portion of the second model; and
   providing the user interface allowing a user to select one or more user points on the three-dimensional model and provide additional information associated with the selected user points.

2. The method of claim 1, wherein the three-dimensional model is determined to be incomplete by determining that one of the plurality of images lacks sufficient quality, and retrieving a stock image of the item to replace the image that lacks sufficient quality, wherein the stock image is not used in the calibrating colors, and wherein the portion of the second model includes the stock image.

3. The method of claim 1, wherein the three-dimensional model is determined to be incomplete by determining that the plurality of images to not depict a certain angle of the item, and retrieving a stock image of the item from that angle to be used to generate the three-dimensional model, wherein the stock image is not used in the calibrating colors, and wherein the portion of the second model includes the stock image.

4. The method of claim 1, further comprising:
   presenting a plurality of three-dimensional models, including the generated three-dimensional model, and manipulating each of the plurality of three-dimensional models to keep them similarly oriented with respect to one of the three-dimensional models being modified by the user.

5. The method of claim 1, further comprising selecting a shipping container for the item by selecting the smallest shipping container available that is capable of enclosing the item using the size of the item as determined by the three-dimensional model of the item; and directing shipping of the item by providing instructions to a shipping carrier including the selected shipping container.

6. The computer-implemented method of claim 5 further comprising indicating an amount of filler material to be used according to the amount of space within the shipping container that is not occupied by the item, according to the three-dimensional model.

7. The computer-implemented method of claim 1, further comprising:
receiving a plurality of images of a portion of a user;
generating a three-dimensional model of the portion of the user;
combining the three-dimensional model of the item with the three-dimensional model of the portion of the user in a three-dimensional environment;
determining whether the item fits the portion of the user by manipulating the three-dimensional models in the three-dimensional environment to determine whether the portion of the user fits inside the item; and
notifying the user whether the item fits the portion of the user.

8. The computer-implemented method of claim 1, further comprising:
retrieving an authentic three-dimensional representation of the item based on a make and model of the item;
comparing the three-dimensional model of the item with the authentic three-dimensional representation of a like item; and
indicating authenticity of the item in response to dimensions of the three-dimensional model of the item being consistent with dimensions of the authentic three-dimensional representation of the like item.

9. A system comprising:
a machine-readable memory having instructions stored thereon, which, when executed by a processor, causes the system to perform operations comprising:
receiving, via a network interface, a plurality of images of an item;
selecting specific points on the item that are depicted in two or more of the images;
triangulating the specific points to generate a plurality of depth maps;
generate a three-dimensional mesh by combining the plurality of depth maps;
generating a three-dimensional model of the item by projecting the plurality of images onto the three-dimensional mesh using the specific points;
calibrating colors used in the three-dimensional model using specular and diffuse properties of colors in the plurality of images;
in response to determining that the three-dimensional model is incomplete, incorporating a portion of a second model of the item to complete the three-dimensional model;
displaying, in a user interface, a visual indicator that distinguishes a first portion of the three-dimensional model that has been completed based on the received plurality of images of the item from a second portion of the three-dimensional model generated from the portion of the second model; and
providing the user interface allowing a user to select one or more user points on the three-dimensional model and provide additional information associated with the selected user points.

10. The system of claim 9, wherein the operations further comprise tracing around the item in each of the images to remove pixels in each image that do not depict a portion of the item.

11. The system of claim 9, wherein the operations further comprise determining whether a database includes a three-dimensional model of a like item and uploading the generated three-dimensional model to the database in response to the database not including the like item.

12. The system of claim 9, wherein the operations further comprise presenting a plurality of three-dimensional models, including the generated three-dimensional model, and manipulating each of the plurality of three-dimensional models to keep them similarly oriented with respect to one of the three-dimensional models being modified by the user.

13. The system of claim 9, wherein the operations further comprise selecting a shipping container for the item by selecting the smallest shipping container available that is capable of enclosing the item using the size of the item as determined by the three-dimensional model of the item; and directing shipping of the item by providing instructions to a shipping carrier including the selected shipping container.

14. The system of claim 9, wherein the operations further comprise:
receiving a plurality of images of a portion of a user;
generating a three-dimensional model of the portion of the user;
combining the three-dimensional model of the item with the three-dimensional model of the portion of the user in a three-dimensional environment;
determining whether the item fits the portion of the user by manipulating the three-dimensional models in the three-dimensional environment to determine whether the portion of the user fits inside the item; and
notifying the user whether the item fits the portion of the user.

15. The system of claim 9, wherein the operations further comprise:
retrieving an authentic three-dimensional representation of the item based on a make and model of the item;
comparing the three-dimensional model of the item with the authentic three-dimensional representation of a like item; and
indicating authenticity of the item in response to dimensions of the three-dimensional model of the item being consistent with dimensions of the authentic three-dimensional representation of the like item.

16. A machine-readable hardware medium having instructions stored thereon, which, when executed by one or more processors of a machine, cause the machine to perform operations comprising:
receiving, via a network interface, a plurality of images of an item;
selecting specific points on the item that are depicted in two or more of the images;
triangulating the specific points to generate a plurality of depth maps;
generate a three-dimensional mesh by combining the plurality of depth maps;
generating a three-dimensional model of the item by projecting the plurality of images onto the three-dimensional mesh using the specific points;
calibrating colors used in the three-dimensional model using specular and diffuse properties of colors in the plurality of images;
in response to determining that the three-dimensional model is incomplete, incorporating a portion of a second model of the item to complete the three-dimensional model;
displaying, in a user interface, a visual indicator that distinguishes a first portion of the three-dimensional model that has been completed based on the received plurality of images of the item from a second portion of the three-dimensional model generated from the portion of the second model; and providing the user interface allowing a user to select one or more user points on the three-dimensional model and provide additional information associated with the selected user points.

17. The machine-readable hardware medium of claim 16, wherein the operations further comprise selecting a shipping container for the item by selecting the smallest shipping container available that is capable of enclosing the item using the size of the item as determined by the three-dimensional model of the item; and directing shipping of the item by providing instructions to a shipping carrier including the selected shipping container.

18. The machine-readable hardware medium of claim 16, wherein the operations further comprise:

receiving a plurality of images of a portion of a user;

generating a three-dimensional model of the portion of the user;

combining the three-dimensional model of the item with the three-dimensional model of the portion of the user in a three-dimensional environment;

determining whether the item fits the portion of the user by manipulating the three-dimensional models in the three-dimensional environment to determine whether the portion of the user fits inside the item; and notifying the user whether the item fits the portion of the user.

19. The machine-readable hardware medium of claim 16, wherein the operations further comprise:

retrieving an authentic three-dimensional representation of the item based on a make and model of the item;

comparing the three-dimensional model of the item with the authentic three-dimensional representation of a like item; and indicating authenticity of the item in response to dimensions of the three-dimensional model of the item being consistent with dimensions of the authentic three-dimensional representation of the like item.

20. The machine-readable hardware medium of claim 16, wherein the operations further comprise determining whether a database includes a three-dimensional model of a similar item as the item depicted in the images and uploading the generated three-dimensional model to the database in response to the database not including the similar item.

* * * * *